US009659065B1

(12) United States Patent
Reis de Sousa

(10) Patent No.: US 9,659,065 B1
(45) Date of Patent: May 23, 2017

(54) RANKING SEARCH RESULTS BASED ON CURRENT OR PAST PRESENCES

(71) Applicant: Google Inc., Mountain View, CA (US)

(72) Inventor: David Reis de Sousa, Belo Horizonte-MG (BR)

(73) Assignee: GOOGLE INC., Mountain View, CA (US)

(*) Notice: Subject to any disclaimer, the term of this patent is extended or adjusted under 35 U.S.C. 154(b) by 196 days.

(21) Appl. No.: 13/910,855

(22) Filed: Jun. 5, 2013

(51) Int. Cl.
*G06F 17/30* (2006.01)

(52) U.S. Cl.
CPC ................ *G06F 17/3053* (2013.01)

(58) Field of Classification Search
CPC .................................. G06F 17/3053
See application file for complete search history.

(56) References Cited

U.S. PATENT DOCUMENTS

| 7,734,632 | B2* | 6/2010 | Wang .................. G06Q 30/02 707/749 |
| 8,010,418 | B1 | 8/2011 | Lee |
| 2005/0216434 | A1* | 9/2005 | Haveliwala et al. ............. 707/1 |
| 2008/0263454 | A1* | 10/2008 | Chan .................. G06Q 30/0603 715/745 |
| 2009/0282104 | A1* | 11/2009 | O'Sullivan .......... G06Q 10/107 709/204 |
| 2009/0307345 | A1* | 12/2009 | Carter .................. G06Q 30/02 709/224 |
| 2010/0262658 | A1 | 10/2010 | Mesnage |
| 2010/0312644 | A1 | 12/2010 | Borgs |
| 2011/0035329 | A1 | 2/2011 | Delli Santi |
| 2011/0238615 | A1* | 9/2011 | Sinha ................ G06F 17/30867 706/52 |
| 2011/0238762 | A1* | 9/2011 | Soni .................... G01C 21/3679 709/206 |
| 2011/0314017 | A1* | 12/2011 | Yariv ..................... G06Q 30/02 707/737 |

(Continued)

FOREIGN PATENT DOCUMENTS

WO 2010141656 A1 12/2010

OTHER PUBLICATIONS

Bandara, Udana, et al., "Tagciti: A Practical Approach for Location-Aware and Socially-Relevant Information Creation and Discovery for Mobile Users", IEEE ISWCS, 2008, pp. 118-122.

(Continued)

*Primary Examiner* — Cam-Y Truong
(74) *Attorney, Agent, or Firm* — Marshall, Gerstein & Borun LLP

(57) ABSTRACT

Systems, methods, and computer-readable media for ranking search results based on current and past presences of a user and a user's contacts from a social graph in accordance with an embodiment of the present invention. A search query is received from a user and search results responsive to the search query are obtained from a search engine. Contacts from a user's social graph are obtained, and presence data for the user and the contacts is obtained. The relevancy scores of the search result entities are modified based on the current presence of a contact at an entity, the past presence of a contact at an entity, and the past presence of the user at an entity. The search results are ranked based on the modified relevancy scores and provided to the user.

20 Claims, 4 Drawing Sheets

(56) References Cited

U.S. PATENT DOCUMENTS

| | | | |
|---|---|---|---|
| 2012/0215773 A1* | 8/2012 | Si ........................... | G06Q 30/02 |
| | | | 707/723 |
| 2012/0233197 A1* | 9/2012 | Tsai ........................ | H04L 51/18 |
| | | | 707/769 |
| 2012/0330722 A1* | 12/2012 | Volpe ................ | G06Q 30/0201 |
| | | | 705/7.32 |
| 2013/0013589 A1* | 1/2013 | Stevenson .............. | G06Q 30/02 |
| | | | 707/722 |
| 2014/0067937 A1* | 3/2014 | Bosworth ............ | H04L 65/403 |
| | | | 709/204 |
| 2014/0214814 A1* | 7/2014 | Sankar et al. ................ | 707/723 |

OTHER PUBLICATIONS

Copending U.S. Appl. No. 13/665,644, entitled "Methods and Computer-Readable Media for Providing Recommended Entities Based on a User's Social Graph," by Sebastian Dorner filed Oct. 31, 2012.

Copending U.S. Appl. No. 13/745,053, entitled "Systems, Methods and Computer-Readable Media for Providing Recommended Entities Based on a Query-Specific Subset of a User's Social Graph," by Mat Balez filed Jan. 18, 2013.

Copending U.S. Appl. No. 13/708,565, entitled "Systems, Methods and Computer-Readable Media for Providing Search Results Having Contacts from a User's Social Graph," by David Reis de Sousa filed Dec. 7, 2012.

* cited by examiner

RANKING SEARCH RESULTS BASED ON CURRENT OR PAST PRESENCES

BACKGROUND OF THE INVENTION

1. Field of the Invention

This invention relates generally to computer-implemented searches and, more particularly, to ranking search results responsive to computer-implemented searches.

2. Description of the Related Art

The Internet is useful for a variety of purposes. For example, users may use the Internet to perform computer-implemented searches, such as searches based on keywords, searches of geographic areas, and so on. For example, a user may search a geographic area to retrieve search results providing information about businesses or other entities located in the geographic area. The search results are generally ranked based on one or more factors, and the ranked list of search results are presented to the user. Depending on the ranking, the presented search results may be more or less useful to the user. In some cases, in ranking search results, the search engine may not leverage information from a user's relationships with other users. Using such information may provide the user with more meaningful search results.

SUMMARY OF THE INVENTION

Various embodiments of systems, methods, and computer-readable media are provided herein. In some embodiments, a computer-implemented method for ranking search results is provided. The method includes obtaining, by one or more processors, a search query associated with a user and identifying, by one or more processors, a contact from a social graph associated with the user. The method also includes obtaining, by one or more processors, search results responsive to the search query, each search result having a relevancy score and modifying, by one or more processors, the relevancy score of a search result associated with an entity based on at least one of: a current presence of the contact at the entity, a past presence of the contact at the entity, or a past presence of the user at the entity. Additionally, the method includes ranking, by one or more processors, the search results based on the relevancy scores and storing, by one or more processors, the search results and the ranking of the search results.

Additionally, in some embodiments, a transitory tangible computer-readable storage medium having executable computer code stored thereon for ranking search results is provided. The code includes a set of instructions that causes one or more processors to perform the following: obtaining, by one or more processors, a search query associated with a user and identifying, by one or more processors, a contact from a social graph associated with the user. The code further includes a set of instructions that causes one or more processors to perform the following: obtaining, by one or more processors, search results responsive to the search query, each search result having a relevancy score and modifying, by one or more processors, the relevancy score of a search result associated with an entity based on at least one of: a current presence of the contact at the entity, a past presence of the contact at the entity, or a past presence of the user at the entity. Additionally, the code also includes a set of instructions that causes one or more processors to perform the following: ranking, by one or more processors, the search results based on the relevancy scores and storing, by one or more processors, the search results and the ranking of the search results.

Additionally, in some embodiments, a system for ranking search results is provided. The system includes one or more processors and a tangible non-transitory memory accessible by the one or more processors and having computer code stored thereon. The code includes a set of instructions that causes one or more processors to perform the following: obtaining, by one or more processors, a search query associated with a user and identifying, by one or more processors, a contact from a social graph associated with the user. The code further includes a set of instructions that causes one or more processors to perform the following: obtaining, by one or more processors, search results responsive to the search query, each search result having a relevancy score and modifying, by one or more processors, the relevancy score of a search result associated with an entity based on at least one of: a current presence of the contact at the entity, a past presence of the contact at the entity, or a past presence of the user at the entity. Additionally, the code also includes a set of instructions that causes one or more processors to perform the following: ranking, by one or more processors, the search results based on the relevancy scores and storing, by one or more processors, the search results and the ranking of the search results.

Figure 1:
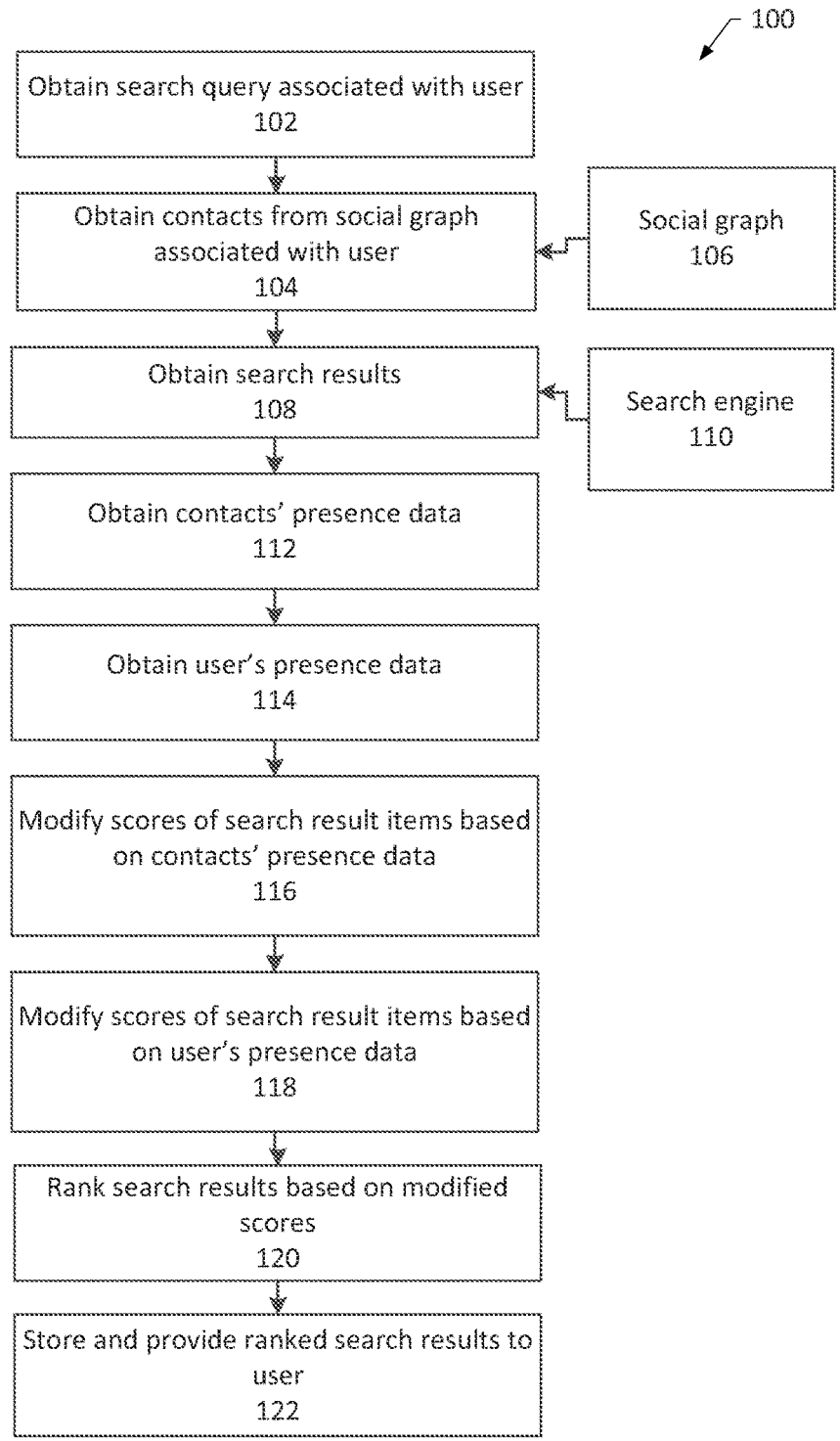
FIG. 1 is a block diagram of a process for ranking search results based on current and past presences of a user and a user's contacts in accordance with an embodiment of the present invention.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

As discussed in more detail below, provided in some embodiments are systems, methods, and computer-readable media for ranking search results based on current and past presences of a user and a user's contacts from a social graph at entities associated with search results. A search query is received from a user and search results responsive to the search query are obtained from a search engine. Each search result may include an associated relevancy score and describe an entity having a geographic location. Contacts from the user's social graph are obtained, such as from a social graph of a social networking service. Additionally, presence data for the user and the contacts is obtained, such as from a location-based service that enables users of the service to indicate their presence (or absence) from the entity. The presence data may include the current presence of a contact at the entity, the past presence of a contact at the entity, and the past presence of the user at the entity. As used herein, the term "entity" may include, for example, a business such as a restaurant, bar, retail store, theme park, arena, theater, and the like. An entity may also include, for example, a park, a library, a gallery, and the like.

The relevancy scores of each search result are modified based on the presence data of the user and/or the contacts from the user's social graph. For example, the relevancy score of a search result may be increased if one or more contacts from the user's social graph have a current presence or past presence at the entity associated with the search result. As described below, the modification may include computing a multiplier or an additive bonus. The relevancy scores of search results may also be modified based on the presence data of the user. For example, the relevancy score of a search result may be increased if the user has a past or current presence at the entity associated with the search result. After modifying the relevancy scores based on the presence data of the user and the user's contacts, the search results may be ranked and provided to the user.

FIG. 1 depicts a process 100 for ranking search results based on current and past presences of a user and contacts from the user's social graph in accordance with an embodiment of the present invention. Some or all steps of the process 100 may be implemented as executable computer code stored on a non-transitory tangible computer-readable storage medium and executed by one or more processors of a special-purpose machine, e.g., a general purpose computer programmed to execute the code. Initially, a search query associated with the user is obtained (block 102). For example, the user may enter a search query in a search engine webpage, a search engine application (e.g., executing on a user's computer), a computer-implemented geographic map, and so on. Next, contacts from a social graph 106 associated with the user are obtained (block 104). In some embodiments, the social graph 106 is a social graph of a social networking service and may be referred to, for example, as the user's "friends" or "circle." Moreover, it should be appreciated that the social networking service or social graph may include multiple social networks or social graphs, and be based on various associations manually entered by the user or automatically determined by the social networking service for the user. Additionally, the social graph 106 may be a symmetric social graph or an asymmetric social graph, and the social graph 106 may be hierarchical.

Next, search results responsive to the query are obtained (block 108) from a search engine 110. The search engine may include indexed webpages, documents, business listings, and other items associated with entities, and may identify search results from the search index based on the search query. A search result may refer to an associated entity, and may be represented by a hyperlink to an item associated with the entity, such as a webpage, document, business listing, or other item. Moreover, the search results obtained from the search engine 110 may include associated scores for ranking the search results before providing them to the user. Next, contact presence data is obtained (block 112). The contact presence data includes the current presence of the user's social contacts at the entity, the past presences of the user's social contacts at the entity, or both. For example, the current presence of the user's social contacts may be obtained from the contacts "check-in" at the entity using a location-based service. Such location-based services may be integral to or separate from the social networking service that includes the social graph 106. Additionally, the user's past and current presence data is obtained (block 114). The user's past and current presence data may be obtained from historical "check-in" data that includes the user's "check-in" at the entity at a past date and time.

In embodiments described herein, users may be provided with an opportunity to permit and/or control whether programs or services are able to obtain, use, or store user information (e.g., information about a user's social network, social actions or activities, preferences, and current or previous locations, etc.).

Next, the scores of the search results are modified based on the presence data of the user's social contacts (block 116). The modification of a score may include any suitable type of modification. In some embodiments the modification may include computing a multiplier for the score of a search result. For example, if a search result score is 100, a multiplier of 1.1 would increase the score to 110. In other embodiments, the modification may include computing an additive bonus for the score. For example, if a score is 100, an additive of 20 would increase the score to 120. If one or more contacts from the user's social graph have a presence at an entity associated with a search result, that search result's relevancy score may be increased based on one or more modifiers. In some embodiments, the score is proportionally increased based on the number of contacts, number of presences, types of presences (e.g., whether current presence or past presence), and so on. For example, if the search query is "Greek restaurants" and "Stephos Greek Cantina" is an entity associated with a responsive search result, and two contacts from the user's social graph 106 have a current presence at "Stephos Greek Cantina," the score of this search result may be increased to reflect the presence of the two contacts. In some embodiments the score may be proportionally increased based on the number of contacts, and/or a relationship score between a contact and the user. For, example, each contact in the user's social graph may have an associated relationship score that is based on the relationship between the contact and the user. In such embodiments, the relationship score may be based on the frequency of communications between the user and the contact, the length of time the contact has been included in the user's social graph, a degree of relationship between the user and the contact, the type of social graph, or other factors or combinations thereof. In some embodiments, a multiplier or additive bonus as described above may be computed based on the number of contacts, number of presences, types of presences (e.g., current presence or past presence), types of contacts (e.g., as measured by the relationship score), and other suitable factors or combination thereof. For example, current presences may be weighted less than past presences, and the weight of a presence may decrease over time so that long ago presences have little to no weight, while current presences have significant weight. The presences of contacts having high relationship scores in the user's social network may be weighted more than the presence of contacts having low relationship scores.

In some embodiments, the scores of the search results may also be modified based on the presence data of the user (block 118). If the user has one or more past presences at an entity associated with a search result, or a current presence, that search result's relevancy score may be increased. As before, the increase can be expressed as an addend or a multiplier, and the value of the addend or multiplier can depend on the age of the presence. Thus, current or recently passed presences can have large addends or multipliers, while distantly past presences can have relatively small addends or multipliers, or none at all. In some embodiments, the score of a search result can be proportionally increased based on the number of presences at the entity. For example, if the search query is "sports bars" and "Jerry's Sports Bar" is an entity associated with a responsive search result, the score of the search result may be increased if the user has a current or one or more past presences at "Jerry's Sports Bar." It should be appreciated that some embodiments may combine all of the above presence data to calculate a modifier for a score of a search result. In some embodiments, each presence may each be assigned a factor of 1 or 0. For example, the current presence of a user may be assigned a factor of 1 if true or 0 if not true, the past presence of a user may be assigned a factor of 1 if true or 0 if not true, the current presence of friend may be assigned 1 for each friend present, and the past presence of a friend may be assigned 1 for each past presence of a friend. In such embodiments the modifier may be calculated according to Equation 1 as shown below:

$$\text{Modifier} = \sum_{i=1}^{4} K_i F_i \quad (1)$$

Where i is the presence (e.g. the current presence of a user, the past presence of a user, the current presence of friend, and the past presence of a friend), Ki is a turning parameter, and Fi is the factor described above. In such embodiments, the modifier calculated according to Equation 1 may be a multiplier or an addend applied to the score of a search result. In other embodiments, the factors described above may be modified by a non-linear scaling function (for example, a logarithm, a cap at a specific value, etc.)

Next, the search results are ranked based on the modified scores (block 120), and the ranked search results are provided to the user (block 122). For example, the search results may be transmitted over a network to the user's computer for display in a search results webpage, search application, or computer-implemented geographic map.

Figure 2:
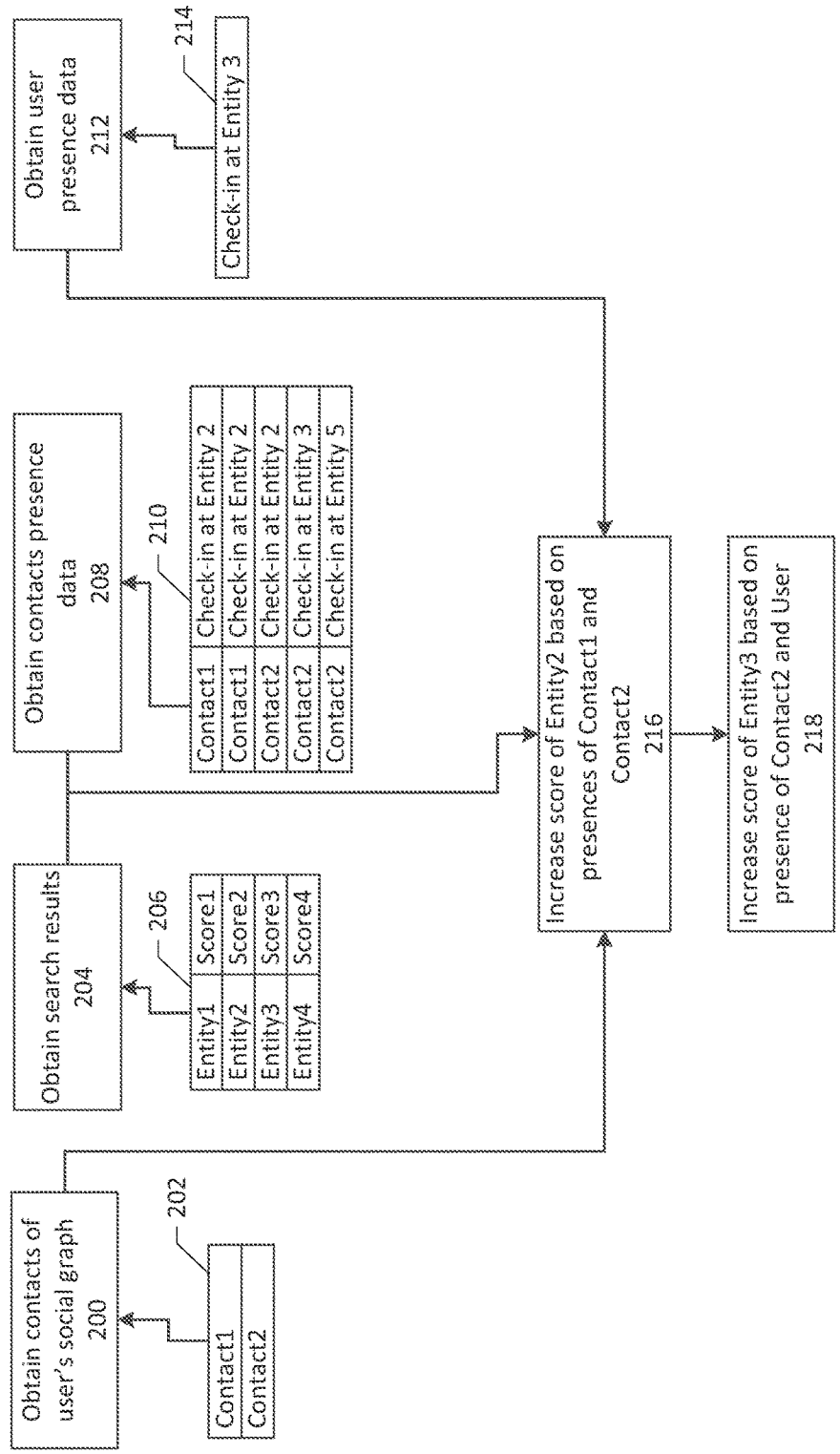
FIG. 2 is a block diagram illustrating the processing of contacts and presences in accordance with an embodiment of the present invention.

FIG. 2 depicts the processing of contacts and presences in accordance with an embodiment of the present invention. As described above, contacts 202 of a user's social graph are obtained (block 200), such as from a social networking service. As shown in FIG. 2, the contacts may include, for example, Contact1 and Contact2. Additionally, as described above, search results 206 responsive to a search query are obtained (block 204), such as from a search engine. The search results 206 may include, for example, results associated with Entity1, Entity2, Entity3, and Entity4, although it should be appreciated that search results 206 may include other types of search results. Additionally, each search result may include a relevancy score (e.g., Score1, Score2, Score3, and Score4) determined from a relevancy of each search result to the search query.

Additionally, as also discussed above, contacts' presence data 210 is obtained (block 208), such as from a location based service. As shown in FIG. 2, the contacts' presence data 210 includes the user's contacts, Contact1 and Contact2, and various presences at different entities, such as "Check-in at Entity 2" and "Check-in at Entity 3." It should be appreciated that other presence data may be obtained that may not be based on check-ins, and such data may be included in the contacts presence data 210. While not shown, the contacts' presence data may include the type of presence (e.g., current or past), the date and time of a presence, and other suitable data. As also mentioned above, the user's presence data 214 is obtained (block 212), such as from the location-based service. The user's presence data 214 may include past or current presences of the user, such as "Check-in at Entity 3." Here again, other presence data may be obtained that may not be based on check-ins, and such data may be included in the user presence data 214. Additionally, the user presence data 214 may include the type of presence (e.g., current presence or past presence), the date and time of a presence, and other suitable data. Optionally, in obtaining the presence data 210 and 214 the list of entities 206 responsive to the search query might be supplied in order to limit the returned information to presence at those entities.

As described above and illustrated in FIG. 1, the scores associated with the search results 206 may be modified based on the presence data for the user and user's contacts. For example, the Score2 of the search result associated with Entity2 may be increased based on the presences of Contact1 and Contact2 at Entity2 (block 216). As shown in FIG. 2, Contact1 has two presences at Entity2 and Contact2 has one presence at Entity2. In some embodiments, the score may be proportionally increased based on the number of contacts, number of presences, types of presences, or any combination thereof. In addition, the increase in the score may be based on the time of the presence, such that more recent presences increase the score more than more distant presences. The score may be increased through a multiplication by a factor, an addition of a bonus or some other method.

Figure 3:
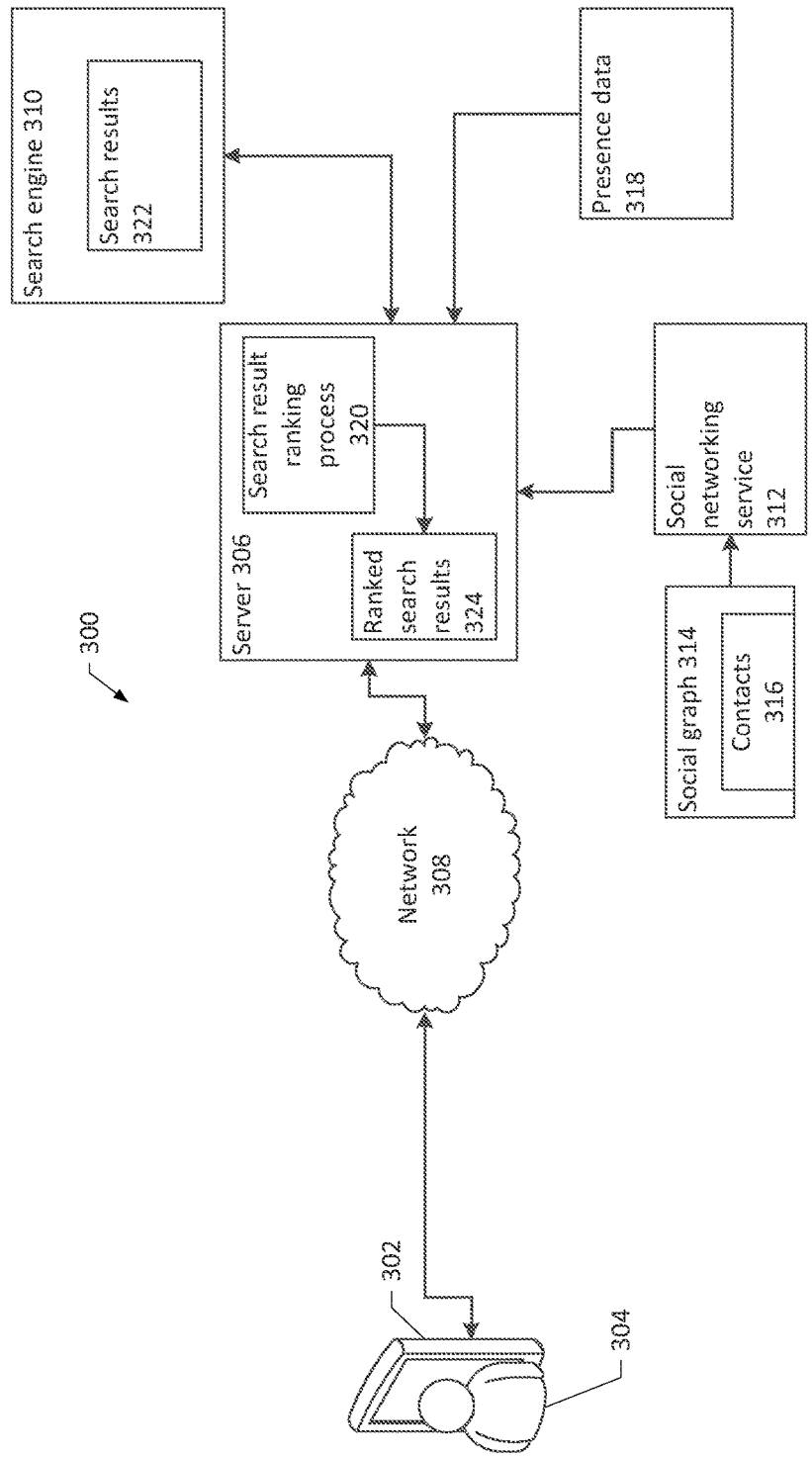
FIG. 3 is a block diagram of a system in accordance with an embodiment of the present invention.

Similarly, the score of the search result (Score3) associated with Entity3 is increased based on the presences of Contact2 and the user at Entity3 (block 218). As shown in FIG. 2, Contact2 has one presence at Entity3 and the user has one presence at Entity3. As noted above, in some embodiments, the score is proportionally increased based on the number of contacts, number of presences, types of presences, or any combination thereof, and the increase in the score can be based on the times of the presences. As also shown in FIG. 3, Contact2 has a presence at Entity5. However, since Entity5 is not included in the search results 206, this presence is not used during modification of the scores of the search results 206.

FIG. 3 depicts a system 300 for ranking search results in accordance with an embodiment of the present invention. The system 300 includes a client computer 302 of a user 304, a server 306 (e.g., one or more servers), and a network 308. The client computer 302 may include laptop computers, tablet computers, smartphones, personal digital assistants, etc. The client computer 302 may also be capable of determining a location via other positioning data, such as Wi-Fi and cellular tower triangulation, and other data. In some embodiments, the client computer 302 may include a desktop computer. As described below, a user may use the client computer 302 to enter search queries, perform computer-implemented searches, and retrieve and view search results.

The server 306 may be a single server (in a discrete hardware component or as a virtual server) or multiple servers. The server 306 may include web servers, application servers, or other types of servers. Additionally, the server 306 may be, for example, computers arranged in any physical and virtual configuration, such as computers in one or more data processing centers, a distributed computing environment, or other configuration. Such configurations may use the network 308 for communication or may communicate over other networks.

The client computer 302 and server 306 are in communication with the network 308, such as through a wired or wireless network interface. In some embodiments, the network 308 may include multiple networks, and may include any suitable network and networking technology, such as the Internet, an intranet, a local area network (LAN), a wide area network (WAN), or any other suitable network. Additionally, the network 308 may include a wired network, a wireless network, or both. Moreover, it should be appreciated that the client computer 302 and server 306 may communicate over different networks separately and simultaneously. For example, the client computer 302 may communicate over both a wireless Ethernet network and a cellular network. Additionally, other components of the system 300 may communicate over the network 308 or different networks.

The server 306 may obtain search results from a search engine 310, such as via a network, e.g., network 308, that enables communication between the search engine 310 and the server 306. The search engine 310 may be implemented on a server (e.g., one or more servers), arranged in any physical and virtual configuration, such as computers in one or more data processing centers, a distributed computing environment, or other configuration. The servers hosting/implementing the search engine 310 may be integral with or separate from the servers 306 hosting/implementing the ranking engine 320.

The server 306 may obtain a social graph from a social networking service 312, such as via a network that enables communication between the social networking service 312 and the server 306. As mentioned above, the social networking service 312 may include a social graph 314 associated with the user 304. The social networking service 312 may be implemented on a server (e.g., one or more servers), arranged in any physical and virtual configuration, such as computers in one or more data processing centers, a distributed computing environment, or other configuration. The servers hosting/implementing the social networking service 312 may be integral with or separate from the servers 306 hosting/implementing the ranking engine 320. The social graph 314 may include contacts 316 having a relationship with the user 304. In some embodiments, the user may use the social networking service 312 to define relationships with the contacts 316. Moreover, as mentioned above, the social graph 314 may be a symmetric social graph or an asymmetric social graph.

The server 306 may obtain presence data from a location-based service that enables users of the service to indicate their presence (or absence) from an entity having a geographic location. For example, the server 306 may communicate with a location-based service via a network, such as network 308 or another network. In other embodiments, the presence data may be obtained from the social networking service 312. The location-based service may be implemented on a server (e.g., one or more servers), arranged in any physical and virtual configuration, such as computers in one or more data processing centers, a distributed computing environment, or other configuration. The servers hosting/implementing the location-based service may be integral with or separate from the servers 306 hosting/implementing the ranking engine 320. The server 306 may include a search result ranking process 320 that modifies the search result scores provided by the search engine 310 according to the techniques described herein, such as the process discussed above and illustrated in FIG. 1. For example, the user 304 enters a search query on the client computer 302, such as via a search engine webpage, a search application, a computer-implemented geographic map, and so on. The server 306 receives the search query from the client computer 302 via the network 308. The search result ranking process 320 obtains search results 322 from the search engine 310 and modifies the scores of the search results based on the presence data 318. As described above, the search result ranking process 320 obtains contacts 316 from the user's social graph 314 and presence data 318 for the contacts 316. Based on the presence data, the scores of the search results are modified (e.g., by a multiplier or additive bonus) and the search results are ranked. The ranked search results 324 are transmitted over the network 308 to the client computer 302. The client computer 302 may display the search results 324 to the user 304, such as in a search results webpage, a search application, a computer-implemented geographic map, and so on.

In other embodiments, a social graph may be obtained from other components. For example, a social graph may be obtained from a location-based service, an address book associated with the user, or other services. Moreover, in some embodiments, social graphs from different components may be used to obtain contacts associated with a user. Additionally, in other embodiments the presence data may be obtained from other components, such as other services that enable users to submit their present location at a date and time.

Figure 4:
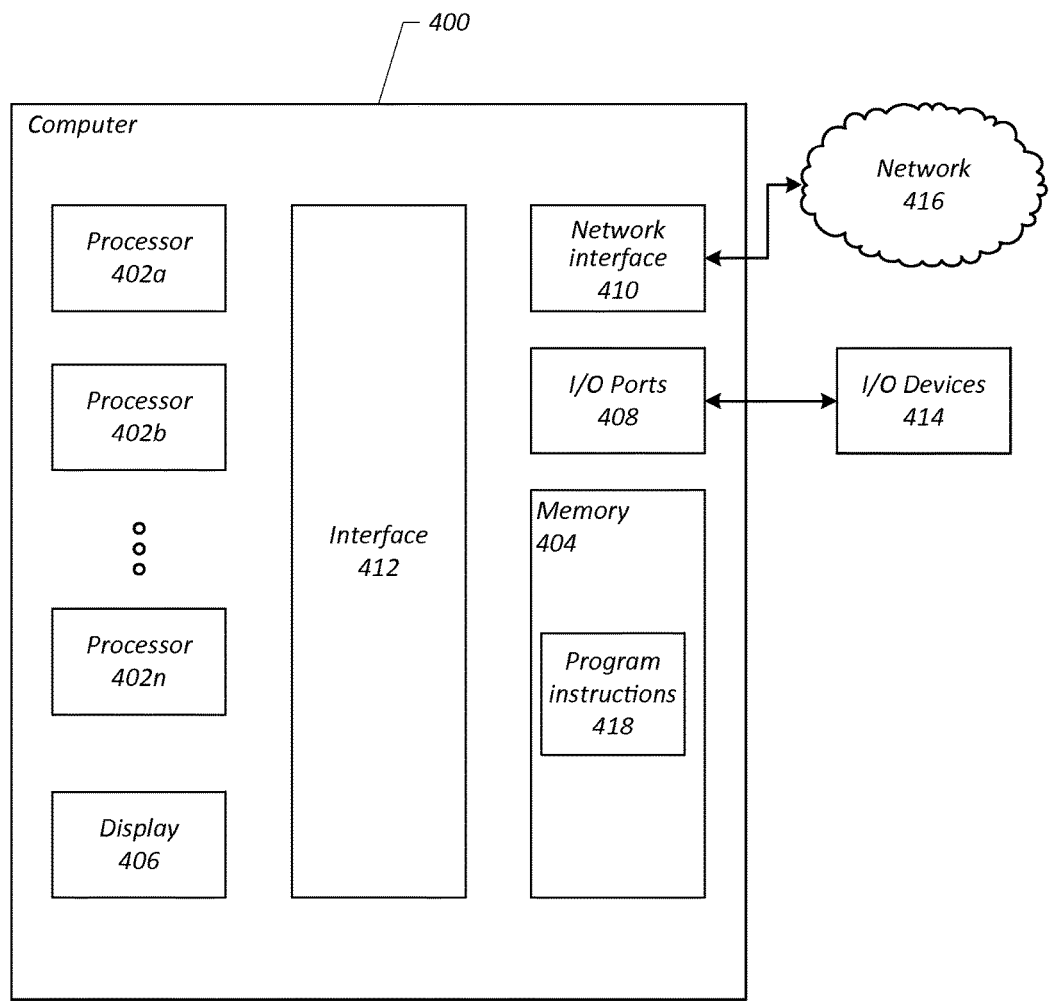
FIG. 4 is a block diagram of a computer in accordance with an embodiment of the present invention.

FIG. 4 depicts a computer 400 in accordance with an embodiment of the present invention. Various portions or sections of systems and methods described herein include or are executed on one or more computers similar to computer 400 and programmed as special-purpose machines executing some or all steps of processes described above as executable computer code. Further, processes, modules, and other components described herein may be executed by one or more processing systems similar to that of computer 400.

The computer 400 may include various components that contribute to the function of the device and enable the computer 400 to function in accordance with the techniques discussed herein. As will be appreciated, some components of computer 400 may be provided as internal or integral components of the computer 400 and some components may be provided as external or connectable components. Moreover, FIG. 4 depicts one example of a particular implementation and is intended to illustrate the types of components and functions that may be present in various embodiments of the computer 400.

Computer 400 may include a combination of devices or software that may perform or otherwise provide for the performance of the techniques described herein. For example, computer 400 may include or be a combination of a cloud-computing system, a data center, a server rack or other server enclosure, a server, a virtual server, a desktop computer, a laptop computer, a tablet computer, a mobile telephone, a personal digital assistant (PDA), a media player, a game console, a vehicle-mounted computer, or the like. The computer 400 may be a unified device providing any one of or a combination of the functionality of a media player, a cellular phone, a personal data organizer, a game console, and so forth. Computer 400 may be connected to other devices that are not illustrated or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available. As shown in the embodiment illustrated in FIG. 4, the computer 400 may include one or more processors (e.g., processors 402a-402n), a memory 404, a display 406, I/O ports 408 a network interface 410, and an interface 412. Additionally, the computer 400 may include or be coupled to I/O devices 414.

In addition, the computer 400 may allow a user to connect to and communicate through a network 416 (e.g., the Internet, a local area network, a wide area network, etc.) and, in some embodiments, to acquire data from a satellite-based positioning system (e.g., GPS). For example, the computer 400 may allow a user to communicate using e-mail, text messaging, instant messaging, or using other forms of electronic communication, and may allow a user to obtain the location of the device from a satellite-based positioning system.

In some embodiments, the display 406 may include a liquid crystal display (LCD) an organic light emitting diode (OLED) display, or other display types. The display 406 may display a user interface (e.g., a graphical user interface) executed by the processor 402 of the computer 400. The display 406 may also display various indicators to provide feedback to a user, such as power status, call status, memory status, network status etc. These indicators may be incorporated in the user interface displayed on the display 406. In some embodiments, the display 406 may include or be provided in conjunction with touch sensitive elements through which a user may interact with the user interface. In such embodiments, a touch-sensitive display may be referred to as a "touch screen" and may also be known as or called a touch-sensitive display system.

The processor 402 may provide the processing capability to execute the operating system, programs, user interface, and other functions of the computer 400. The processor 402 may include one or more processors and may include "general-purpose" microprocessors, special purpose microprocessors, such as application-specific integrated circuits (ASICs), or any combination thereof. In some embodiments, the processor 402 may include one or more reduced instruction set (RISC) processors, such as those implementing the Advanced RISC Machine (ARM) instruction set. Additionally, the processor 402 may include single-core processors and multicore processors and may include graphics processors, video processors, and related chip sets. Accordingly, the computer 400 may be a uni-processor system having one processor (e.g., processor 402a), or a multi-processor system having two or more suitable processors (e.g., 402a-402n). Multiple processors may be employed to provide for parallel or sequential execution of the techniques described herein. Processes, such as logic flows, described herein may be performed by the processor 402 executing one or more computer programs to perform functions by operating on input data and generating corresponding output. The processor 402 may receive instructions and data from a memory (e.g., system memory 404).

The memory 404 (which may include one or more tangible non-transitory computer readable storage mediums) may include volatile memory and non-volatile memory accessible by the processor 402 and other components of the computer 400. The memory 404 may store a variety of information and may be used for a variety of purposes. For example, the memory 404 may store executable computer code, such as the firmware for the computer 400, an operating system for the computer 400, and any other programs or other executable code for providing functions of the computer 400. Such executable computer code may include program instructions 418 executable by a processor (e.g., one or more of processors 402a-402n) to implement one or more embodiments of the present invention. Program instructions 418 may include modules of computer program instructions for implementing one or more techniques described herein. Program instructions 418 may include a computer program (which in certain forms is known as a program, software, software application, script, or code). A computer program may be written in a programming language, including compiled or interpreted languages, or declarative or procedural languages. A computer program may include a unit suitable for use in a computing environment, including a stand-alone program, a module, a component, a subroutine, and the like. A computer program may or may not correspond to a file in a file system. A computer program may be stored in a section of a file that holds other computer programs or data (e.g., one or more scripts stored in a markup language document), in a single file dedicated to the program in question, or in multiple coordinated files (e.g., files that store one or more modules, sub programs, or sections of code). A computer program may be deployed to be executed on one or more processors located locally at one site or distributed across multiple remote sites and interconnected by a communication network. Additionally, the memory 404 may be used for buffering or caching during operation of the computer 400.

As mentioned above, the memory 404 may include volatile memory, such as random access memory (RAM). The memory 404 may also include non-volatile memory, such as ROM, flash memory, a hard drive, other suitable optical, magnetic, or solid-state storage mediums or any combination thereof. The memory 404 may store data files such as media (e.g., music and video files), software (e.g., for implementing functions on computer 400), user preference information, payment transaction information, wireless connection information, contact information (e.g., an address book), and any other suitable data.

The interface 412 may include multiple interfaces and may enable communication between various components of the computer 400, the processor 402, and the memory 404. In some embodiments, the interface 412, the processor 402, memory 404, and one or more other components of the computer 400 may be implemented on a single chip, such as a system-on-a-chip (SOC). In other embodiments, these components, their functionalities, or both may be implemented on separate chips. The interface 412 may coordinate I/O traffic between processors 402a-402n, the memory 404, the network interface 410, 414, or any other devices or a combination thereof. The interface 412 may perform protocol, timing or other data transformations to convert data signals from one component (e.g., the memory 404) into a format suitable for use by another component (e.g., processors 402a-402n). The interface 412 may implement various types of interfaces, such as Peripheral Component Interconnect (PCI) interfaces, the Universal Serial Bus (USB) interfaces, Thunderbolt interfaces, Firewire (IEEE-1394) interfaces, and so on.

The computer 400 may also include an input and output port 408 to enable connection of additional devices, such as I/O devices 414. Embodiments of the present invention may include any number of input and output ports 408, including headphone and headset jacks, universal serial bus (USB) ports, Firewire (IEEE-1394) ports, Thunderbolt ports, and AC and DC power connectors. Further, the computer 400 may use the input and output ports to connect to and send or receive data with any other device, such as other portable computers, personal computers, printers, etc.

The computer 400 depicted in FIG. 4 also includes a network interface 410. The network interface 410 may include a wired network interface card (NIC), a wireless (e.g., radio frequency) network interface card, or combination thereof. The network interface 410 may include known circuitry for receiving and sending signals to and from communications networks, such as an antenna system, an RF transceiver, an amplifier, a tuner, an oscillator, a digital signal processor, a modem, a subscriber identity module (SIM) card, memory, and so forth. The network interface 410 may communicate with networks (e.g., network 416), such as the Internet, an intranet, a cellular telephone network, a wide area network (WAN), a local area network (LAN), a metropolitan area network (MAN), or other devices by wired or wireless communication. The communication may use any suitable communications standard, protocol and technology, including Ethernet, Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11 standards), voice over Internet Protocol (VoIP), Wi-MAX, an email protocol (e.g., Internet message access protocol (IMAP) or post office protocol (POP)), message-oriented protocols (e.g., extensible messaging and presence protocol (XMPP), Multimedia Messaging Service (MMS), Short Message Service (SMS), or any other suitable communications standards, protocols, and technologies.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method for ranking search results, the method comprising:
   receiving, by one or more processors, a search query from a user of a client device;
   identifying, by the one or more processors, a search result responsive to the search query, the search result having a relevancy score and being associated with an entity having a geographic location;
   identifying, by the one or more processors, a contact from a social graph associated with the user, including determining that the contact indicated his or her physical presence at the entity using a location-based service, wherein the physical presence is one of a current physical presence or past physical presence;
   modifying, by the one or more processors, the relevancy score of the search result associated with the entity based on the type of physical presence of the contact at the entity, including modifying the relevance score with a first weight when the presence is current physical presence and with a second weight when the presence is a past physical presence, wherein the first weight is larger than the second weight;
   ranking, by the one or more processors, the search result among a plurality of search results based on the relevancy score; and
   transmitting, by the one or more processors, the search results to the client device.

2. The computer-implemented method of claim 1, wherein
   modifying the relevancy score of the search result further comprises:
      identifying, by the one or more processors, at least one of a current physical presence or a past physical presence of the user at the entity associated with the search result; and
      modifying, by the one or more processors, the relevancy score of the search result further based on the at least one current physical presence or past physical presence of the user at the entity associated with the search result.

3. The computer-implemented method of claim 2, wherein the past physical presence or current physical presence of the user at the entity comprises a check-in of the user at the entity.

4. The computer-implemented method of claim 1, wherein the current physical presence of the contact at the entity comprises a check-in of the contact at the entity.

5. The computer-implemented method of claim 1, comprising obtaining the social graph associated with the user from a social networking service.

6. The computer-implemented method of claim 1, wherein modifying the relevancy score comprises computing a multiplier or an additive bonus.

7. The computer-implemented method of claim 1, wherein modifying the relevancy score of the search result comprises:
  generating a relationship score based on a degree of relationship between the user and the contact; and
  modifying the relevancy score using the relationship score.

8. The method of claim 1, wherein modifying the relevancy score includes decreasing a weight with which the relevancy score is modified over time to give more weight to a more recent physical presence of the contact at the entity.

9. A non-transitory tangible computer-readable storage medium having executable computer code stored thereon for ranking search results, the code comprising a set of instructions that causes one or more processors to perform the following:
  receiving, by the one or more processors, a search query from a user of a client device;
  identifying, by the one or more processors, a search result responsive to the search query, the search result having a relevancy score and being associated with an entity having a geographic location;
  identifying, by the one or more processors, a contact from a social graph associated with the user, including determining that the contact indicated his or her physical presence at the entity using a location-based service, wherein the physical presence is one of a current physical presence or past physical presence;
  modifying, by the one or more processors, the relevancy score of the search result associated with the entity based on the current physical presence of the contact at the entity, including modifying the relevance score with a first weight when the presence is current physical presence and with a second weight when the presence is a past physical presence, wherein the first weight is larger than the second weight;
  ranking, by the one or more processors, the search result among a plurality of search results based on the relevancy score; and
  transmitting, by the one or more processors, the search results to the client device.

10. The non-transitory tangible computer-readable storage medium of claim 9, wherein modifying the relevancy score of the search result further comprises:
  identifying at least one of a current physical presence or a past physical presence of the user at the entity associated with the search result;
  modifying the relevancy score of the search result further based on the at least one of the current physical presence or past physical presence of the user at the entity associated with the search result.

11. The non-transitory tangible computer-readable storage medium of claim 10, wherein the past physical presence or current physical presence of the user at the entity comprises a check-in of the user at the entity.

12. The non-transitory tangible computer-readable storage medium of claim 9, wherein the current physical presence of the contact at the entity comprises a check-in of the contact at the entity.

13. The non-transitory tangible computer-readable storage medium of claim 9, the code comprising a set of instructions that causes the one or more processors to perform the following: obtaining the social graph associated with the user from a social networking service.

14. The non-transitory tangible computer-readable storage medium of claim 9, wherein modifying the relevancy score comprises computing a multiplier or an additive bonus.

15. The non-transitory tangible computer-readable storage medium of claim 9, wherein modifying the relevancy score comprises proportionally increasing the relevancy score based on a relationship score between the contact and the user.

16. A system for ranking search results, the system comprising:
  one or more processors; and
  a tangible non-transitory memory accessible by the one or more processors, the memory having computer code stored thereon, the code comprising a set of instructions that causes the one or more processors to perform the following:
  receiving, by the one or more processors, a search query from a user of a client device;
  identifying, by the one or more processors, a search result responsive to the search query, the search result having a relevancy score and being associated with an entity having a geographic location;
  identifying, by the one or more processors, a contact from a social graph associated with the user, including determining that the contact indicated his or her physical presence at the entity using a location-based service, wherein the physical presence is one of a current physical presence or past physical presence;
  modifying, by the one or more processors, the relevancy score of the search result associated with the entity based on the current physical presence of the contact at the entity, including modifying the relevance score with a first weight when the presence is current physical presence and with a second weight when the presence is a past physical presence, wherein the first weight is larger than the second weight;
  ranking, by the one or more processors, the search result among a plurality of search results based on the relevancy score; and
  transmitting, by the one or more processors, the search results to the client device and the ranking of the search results.

17. The system of claim 16, where modifying the relevancy score of the search result further comprises:
  identifying at least one of a current physical presence or a past physical presence of the user at the entity associated with the search result; and
  modifying the relevancy score of the search result further based on the at least one current physical presence or past physical presence of the user at the entity associated with the search result.

18. The system of claim 17, wherein the past physical presence or current physical presence of the user at the entity comprises a check-in of the user at the entity.

19. The system of claim 16, wherein the current physical presence of the contact at the entity comprises a check-in of the contact at the entity.

20. The system of claim 16, wherein modifying the relevancy score comprises computing a multiplier or an additive bonus.

* * * * *